Nov. 3, 1959 W. DUBILIER 2,910,764
METHOD FOR MANUFACTURING ELECTRICAL CONDENSERS
Filed Feb. 1, 1955

INVENTOR.
WILLIAM DUBILIER
BY W. D. Keith
ATTORNEY

United States Patent Office 2,910,764
Patented Nov. 3, 1959

2,910,764

METHOD FOR MANUFACTURING ELECTRICAL CONDENSERS

William Dubilier, New Rochelle, N.Y., assignor to Cornell-Dubilier Electric Corporation, South Plainfield, N.J., a corporation of Delaware Application February 1, 1955, Serial No. 485,538

2 Claims. (Cl. 29—25.42)

This invention relates to the manufacture of capacitors and particularly to the manufacture of capacitors of the type wherein a strip of metallized paper or equivalent flexible dielectric material is provided with demetallized track defining electrode areas thereon which are proportioned to mutually cooperate or register in a rolled unit to constitute electrodes of opposite polarity.

In such type of capacitors the demetallized track is conveniently formed of alternate and connected longitudinal and transverse sections with the spacing intermediate successive transverse sections being varied to provide successive electrode areas of proper dimension to overlap or register in the wound unit. For example, when the rolled unit is right-cylindrical in shape, the circumference thereof for each convolution increases by the increment $2\pi T$ over that for the preceding convolution where T is the thickness of the metallized strip. The spacings between the successive transverse tracks must necessarily vary in accordance with the incremental increase in the circumference of the roll so that the width of each successive electrode area is related to the respective circumference or convolution of wound unit in which it ultimately is disposed and thereby causes the cooperating electrode areas of opposite polarity to overlap or register in the finished unit. Various means and methods of effecting the desired spacing of the transverse track sections are taught in my copending application Serial Number 405,092, filed January 20, 1954, now patent No. 2,716,180, issued August 23, 1955.

One of the preferred methods for manufacturing capacitors of the above type is to wind the strip material on a mandrel having a constant speed of rotation and utilize the linear speed increase resulting from the circumferential build up of the wound unit to control the desired spacing of the successive transverse demetallized tracks placed thereon by the demetallizing electrodes. In such a system, however, the usual mechanism is such that the distance from the point at which the demetallizing is being effected to the winding mandrel is such as to represent a number of turns or convolutions in the capacitor roll. This results in an undesirable progressive deviation in registry of the electrode areas in the wound unit with an accompanying loss in capacity for any given number of turns. Such undesirable deviation in registry is of particular importance in the fabrication of smaller sizes of capacitors.

This invention may be briefly described as apparatus for fabricating single web capacitors of the above type wherein direct winding of a capacitor on a patterning control mandrel may be effected with minimal deviations in the registry of the electrodes of the wound unit.

The object of this invention is the provision of improved apparatus for the fabrication of single web types of capacitors.

Other objects and advantages of the invention will be pointed out in the following description and claims and illustrated in the accompanying drawings which describe, by way of example, the principles underlying the invention and the presently preferred embodiments of the capacitor fabrication apparatus employing those principles.

Referring to the drawings.

Figure 1:
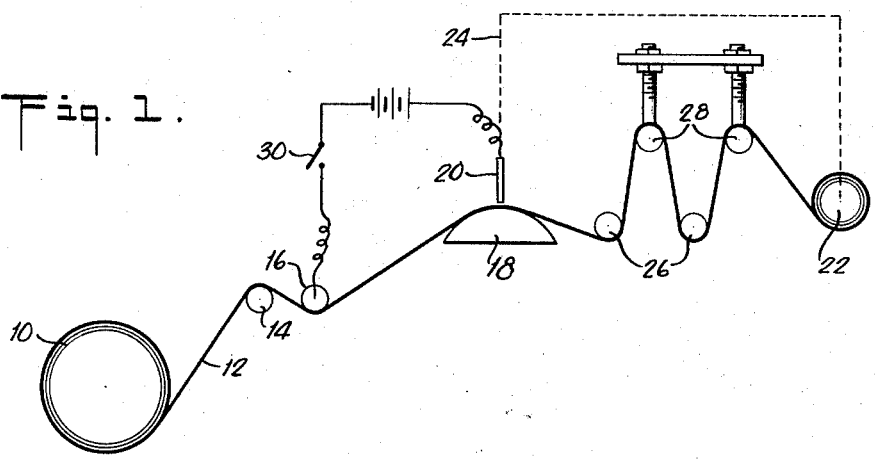
Fig. 1 is a schematic representation of the capacitor fabrication apparatus incorporating the principles of this invention.

Referring to Fig. 1, there is provided a supply roll 10 of a metallized web or strip 12 of paper or other suitable dielectric material. The metallized strip 12 is passed around a guide roller 14 associated with a cooperating contact roller 16 and over a suitably curved or arcuately shaped support 18 which may be either fixed or preferably in the form of a freely rotatable wheel. The strip 12 with its metallized coating facing in an upward direction is drawn, in the example shown, from the supply roll 10 past the demetallizing electrode unit 20 by rotation of the winding mandrel 22. In the illustrated unit it will be understood that the demetallizing electrode unit 20 is schematically illustrated and that the desired patterning of the strip 12 is controlled by rotation of the winding mandrel as indicated generally by the dotted line 24. Specific details of the type of demetallizing electrode unit and the type of control mentioned above are set forth in my copending application Serial No. 405,092, reference to which is hereby made.

The desired patterning of the metallized paper is effected by burning away the metallized coating immediately beneath the demetallizing electrode 20. In the usual type of unit, the distance intermediate the electrode unit 20 and the winding mandrel 22 is such that when the pattern beneath the electrode unit, which is spaced in accordance with the then diameter of the roll, reaches the roll on the mandrel, it is slightly out of register due to the increased circumference of the roll effected by the length of paper disposed intermediate the mandrel and the electrode unit.

To overcome this difficulty I propose that the winding of a given capacitor take place coincidentally with the patterning of the subsequent capacitor and to this end provide for an adjustable "hang-up" assembly disposed intermediate the electrode unit 20 and the winding mandrel 22 sufficient to accommodate a length of strip 12 equal to the length of at least one full capacitor unit. Such capacitor unit includes starting and ending layers of the strip 12. These layers are composed of portions of the strip where the metallized coating is completely burned off, and do not form an active part of the capacitor electrically. Specifically there are provided a plurality of fixed guide rolls 26 positioned in cooperative relationship with a plurality of adjustably positioned guide rolls 28 and arranged to provide a serpentine path of travel for the strip of sufficient length to "hang-up" a strip length at least equal to that required for one full capacitor.

In operation of the described apparatus, the operator would first preset the adjustable guide rollers 28 in accordance with the length of capacitor to be fabricated and then would thread the metallized strip 12 through the unit as illustrated in the drawings and attach the free end thereof to the winding mandrel 22. The demetallizing circuit is then completed as by the switch 30 and the patterning is effected under control of the winding mandrel as described in the above mentioned copending application. After the mandrel 22 winds up a desired capacitor section, as represented by a predetermined number of turns thereof which includes turns as necessary for the beginning and ending (entirely demetallized) portions, the length of strip 12 disposed in the storage space intermediate the electrode unit 20 and the mandrel 22 will contain a completely demetallized strip of proper pattern. The strip material initially wound upon the mandrel 22 is then removed and discarded and the patterned strip, now disposed intermediate the electrode unit 20 and the mandrel 22 is wound upon the mandrel during the fabrication of the next capacitor unit. When the mandrel 22 again commences its rotation, the diameter of the roll thereon is exactly the same as it was at the corresponding stage in the winding of the preceding capacitor strip, or the initial discarded strip, as the case may be, and the patterning of the strip being wound will be in complete registry. Coincidentally therewith, the patterning then being effected by the electrode unit 22 will be in desired accord with the diameter of the capacitor roll on the mandrel. Thus when one unit is wound, the increased diameter of this unit will proportionately pattern the metallized paper beneath the electrode 20 for the subsequent capacitor unit and so on. Adequate provision is also thus made for spacing paper allowance required for the beginning and end turns of the capacitor unit. In addition thereto, the adjustability of the guide rolls 28 permits ready adaptation of the unit for varying lengths of capacitor and for varying thickness of dielectric material utilized.

Figure 2:
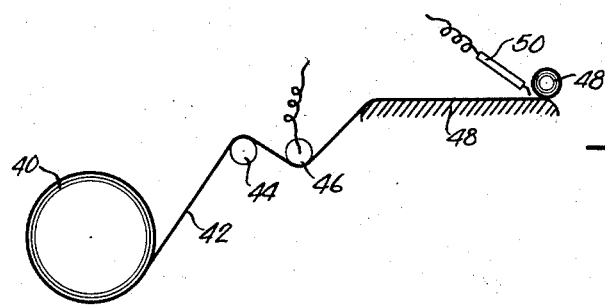
Fig. 2 is a schematic representation of another and alternate form of the apparatus incorporating the principles of this invention.

An alternative apparatus for effecting the desired result is illustrated in Fig. 2. In this embodiment there is provided a supply roll 40 of a metallized web or strip 42 of paper or other suitable dielectric material. The metallized strip 42 is passed around a guide roller 44 cooperatively associated with a contact roller 46 and over a smooth plate-like member 48. Positioned adjacent one end of the plate-like member 48 is a demetallizing electrode assembly 50. In operation of the device, the demetallized strip 42 is threaded through the apparatus as illustrated on the drawings and the free end thereof placed upon the winding mandrel 52. As the winding mandrel 52 is disposed closely adjacent the demetallizing electrode assembly 50, the lack of registry resulting from the length of strip disposed intermediate the electrode assembly 50 and winding mandrel 52 is minimized and the small deviation from registry resulting from such a construction is such that can be readily tolerated in commercial construction.

Where the capacitor to be wound upon a mandrel 52 is of comparatively large diameter, the winding mandrel 52 can be displaceably mounted so that as the diameter of the roll wound thereon increases, the center of the winding mandrel would gradually move away from the demetallizing electrode assembly 50. As even the larger-sized capacitors are of comparatively small diameter, the small amount of displacement necessary to effect the winding of a large unit would not result in any lack of registry beyond commercially acceptable tolerances.

Figure 3:
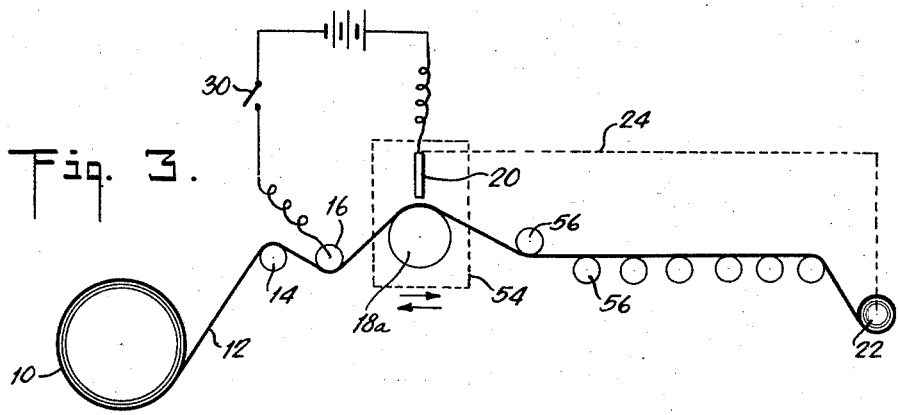
Fig. 3 is a schematic representation of still another form of the apparatus incorporating the principles of this invention.

Another alternative that is especially suitable for relatively small capacitors where the length of an entire section is comparatively short, is that illustrated in Fig. 3. In this embodiment the elements are basically the same as those of the Fig. 1 embodiment, and consequently the same reference numbers are used to identify the identical elements.

In Fig. 3 the spacing, or length of the strip 12, between the electrode unit 20 and the mandrel 22, is adjustable by means of horizontal adjustments of a support 54. This support 54 carries a supporting wheel 18a which corresponds with the support 18 of Fig. 1. After leaving the support wheel 18a the strip 12 passes over fixed guide rolls 56 and along a flat straight path where visual inspection might be had if desired. Finally the strip is rolled on the mandrel 22, as before.

In accordance with the provisions of the patent statutes, I have herein described the principle of operation of this invention, together with the elements which I now consider to constitute a workable embodiment thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention I claim:

1. Apparatus for fabricating small diameter convolutely wound capacitors of patterned metallized dielectric material in strips of predetermined length comprising a winding mandrel, and a demetallizing electrode assembly controlled by said winding mandrel for demetallizing predetermined portions of said metallized dielectric material, with said winding mandrel and electrode assembly being spaced apart a distance measured on said dielectric material substantially equal to the length of the strip forming the capacitor being fabricated times a whole integer.

2. Apparatus for fabricating small diameter convolutely wound capacitors of patterned metallized dielectric material in strips of predetermined length comprising a winding mandrel, a demetallizing electrode assembly controlled by said winding mandrel for demetallizing predetermined portions of said metallized dielectric material and disposed in predetermined linear spaced relation from said winding mandrel, and means disposed intermediate said winding mandrel and said demetallizing electrode assembly for effectively spacing apart said elements a distance measured on said dielectric material substantially equal to the length of the strip forming the capacitor being fabricated times a whole integer.

References Cited in the file of this patent

UNITED STATES PATENTS 2,731,705     Grouse _____ Jan. 24, 1956

FOREIGN PATENTS 680,843     Great Britain _____ Oct. 15, 1952